Dec. 6, 1966 J. P. HEILWEIL ETAL 3,289,352
GASKET CONSTRUCTION
Filed Jan. 15, 1964 2 Sheets-Sheet 1

INVENTORS.
JEROME P. HEILWEIL
ALBERT E. SCHWEIZER
BY
ATTORNEY.

3,289,352
GASKET CONSTRUCTION

Jerome P. Heilweil and Albert Edward Schweizer, Philadelphia, Pa., assignors to Glenco Refrigeration Corporation, Philadelphia, Pa., a corporation of Pennsylvania
Filed Jan. 15, 1964, Ser. No. 337,761
2 Claims. (Cl. 49—485)

This invention relates to a door for closing the access opening of a refrigerator, or other enclosure in which heat transfer into or out of the enclosure is to be minimized.

Doors of this type, or the wall of the cabinet defining the access opening to be closed by a door or both may be provided with resilient gaskets made of rubber or other material which is compressible and has a low coefficient of heat conduction.

Due to frequent opening and closing of the door the gasket sooner or later loses its resiliency and must be replaced and to facilitate this operation the gasket is usually secured in positions by means of spring, clip, or the like, which engage the gasket and the supporting surface to which the gasket is to be secured. This procedure is not wholly satisfactory because the clips, collectively, provide a considerable heat flow path and because they, too, deteriorate and must be replaced.

It is therefore one object of the invention to produce an improved construction which includes a gasket retainer permanently secured to the door, or to the cabinet and a gasket which is detachably mounted on the retainer whereby the gasket may be removed and installed without disturbing the retainer and without the use of any good heat conducting material.

In previous practice, the space between the inner and outer walls of the door has been stuffed with insulating material, such as spun glass, mineral wool, or the like and the walls were secured together in the least heat-transferring manner available. More recently, it has become the practice to insulate the inner wall of a door from the outer door thereof by means of a solid polyeurethane foam which is produced by mixing measured quantities of polyol with isocyanate in a manner which is well known in this art. This is only by way of example because any other compound which can produce a light, non-heat conducting solid foam which will adhere to metal or other surfaces will do.

It is therefore a still further object of the invention to produce an improved construction in which the gasket retainer is anchored in position by the polyurethane foam.

A still further object of the invention is to produce an improved gasket retainer which lends itself to the method of fastening immediately above referred to and to produce an improved gasket structure which will produce an effective seal; which will reduce heat transfer to a minimum which is easily engageable with, and disengageable from the gasket retainer referred to.

Figure 1:
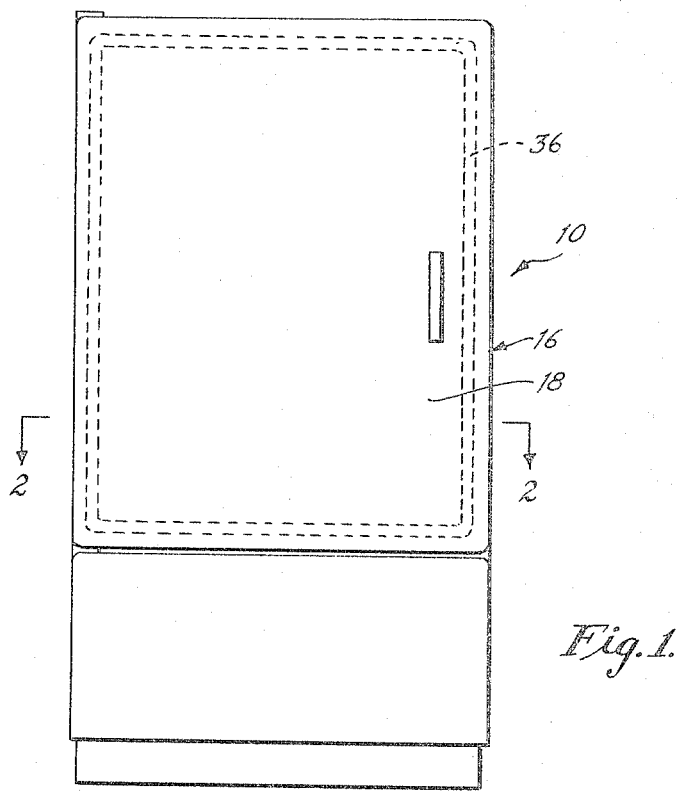
Figure 2:
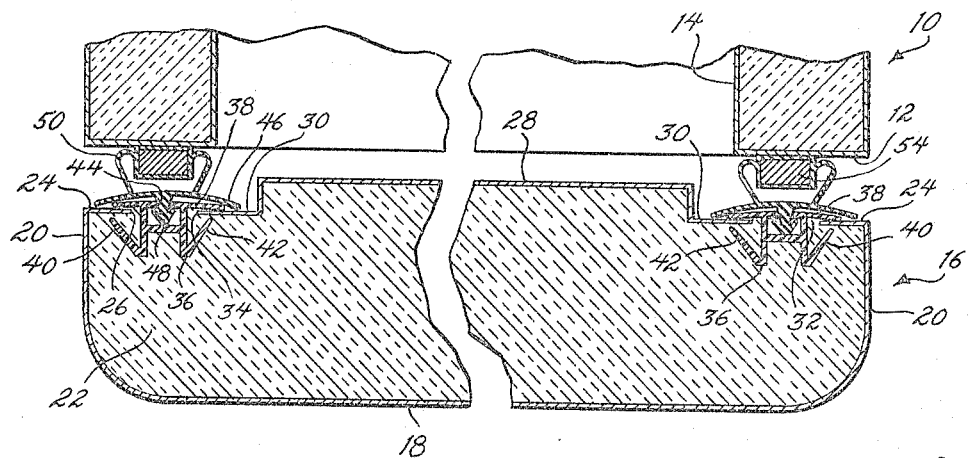

The full nature of the invention will be understood from the following specification and the accompanying drawings in which FIG. 1 is a front elevational view of a refrigerator provided with a gasket and gasket retainer of this invention FIG. 2 is a sectional view looking in the direction of the line 2—2 of FIG. 1

Figure 3:
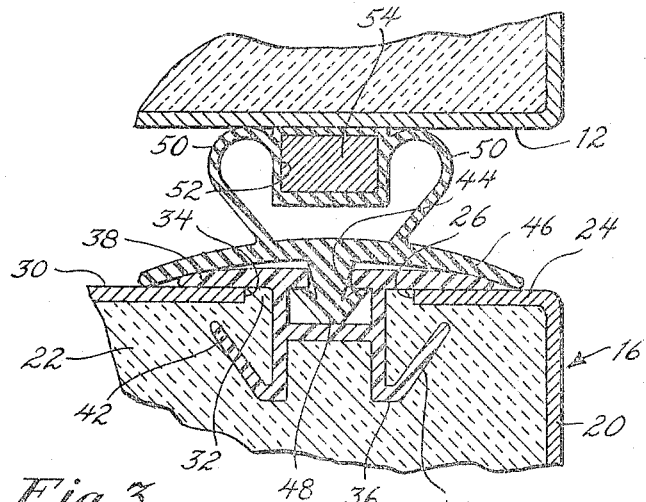
Figure 4:
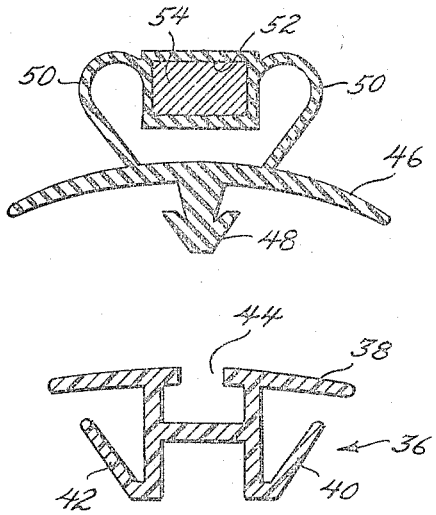

FIG. 3 is a greatly enlarged view of a position of FIG. 1 to show details of construction FIG. 4 is an exploded view more clearly to show the structure of the gasket and the gasket retainer In the drawings, 10 designates a refrigerator cabinet the front wall 12 of which is provided with an access opening 14 adapted to be closed by a door 16. The structure of the cabinet 10 is not a part of the present invention and will not be further referred to.

The door of the present invention is formed of an outer panel 18 and an inner panel 28 which coact to form an enclosure for receiving insulation 22.

Outer panel 18 is provided with inturned side and end walls 20 which are bent to form an inwardly extending flange 24 having a free edge 26.

Inner panel 28 may be in one plane or it may be provided with an offset flange 30 which is coplanar with flange 24. It will be noted that the over-all dimensions of inner panel 28 are smaller than the opening defined by edge 26 of flange 24 whereby edge 34 of the flange 30 cooperates with edge 26 of flange 24 to define a continuous slot 32 for receiving the gasket retainer shown at the bottom of FIG. 4.

The gasket retainer of this invention includes a generally H-shaped body portion, which is adapted to be passed through opening 32, and an outer, generally flat body portion 38 which is adapted to straddle the marginal portions of flanges 24 and 30 to close opening 32. The retainer is provided with arms 40 and 42 which originate near the inner end of the H and diverge in the direction of body portion 38. By this arrangement, marginal portions of flanges 24 are clamped between the arms 40 and 42 and the corresponding portions of body 38 of the gasket retainer.

The insulation illustrated is produced by the introduction of measured quantities of foam-producing liquids, as is well known in the trade.

The gasket includes a wall 46 which is preferably slightly arched and which is provided with an arrow-shaped head 48 for insertion through opening 44 detachably to secure the gasket to the gasket retainer. It should be noted that the length of head 48 is such that while the tapered end thereof abuts the connecting bar of the H, the diverging end of said head will tightly abut the inner sides of the walls which define openings 44 firmly to engage the gasket with the gasket retainer which is anchored in the foam. Wall 46 may be made thick enough or may be provided with a ridge or rib for abutting the front wall 12 of the cabinet but, as shown, the wall 46 of the gasket is provided with heat insulating resilient wings 50 which carry a chamber 52 also formed of heat insulating compressible resilient material. Chamber 50 may be empty so as to provide for more compression and a better seal, or for automatic closing, it may contain a magnet 54 for automatically drawing the door to closed position.

What we claim is:
1. A door construction including an outer panel having side and end walls terminating in an inwardly extending peripheral flange which is spaced from, and is parallel to, said outer panel, the edge of said flange defining an opening, an inner panel co-planar with said flange and coacting with said outer panel and said side and end walls to form an insulation material receiving enclosure.

the edge of said inner panel being spaced from the edge of said flange to form a slot, and a gasket retainer carried by said flange and by the adjacent edge of said inner panel and closing said slot, said retainer comprising:

a body portion adapted to overlie the adjacent marginal portions of said flange and said inner panel, an engaging member generally shaped to simulate the letter H, and carried by said body portion, outwardly diverging arms extending from the inner ends of the limbs of this H toward the marginal portions of said flange and said inner panel, respectively, said engaging member being insertable through said slot when said arms are compressed, a gasket comprising a wall adapted to overlie said body portion, there being an aperture in said body portion aligning with the space between the outer ends of the limbs of the H, an arrow shaped head carried by said wall and insertable through said aperture, and into said space, the maximum dimension of said head being greater than the width of said aperture and the distance between the cross bar and outer ends of the limbs of the H being such that, when the tip of the head engages the cross bar of the H, the opposite end of said head engages the inner face of said body portion to either side of said aperture.

2. The structure defined in claim 1 in which said body portion is flat and in which said wall is arcuate in cross section.

References Cited by the Examiner

UNITED STATES PATENTS 3,137,900   6/1964   Carbary _____ 20—35

HARRISON R. MOSELEY, Primary Examiner.

KENNETH DOWNEY, Assistant Examiner.